United States Patent [19]

Zollinger

[11] E Re. 31,041

[45] Reissued Sep. 28, 1982

[54] YARN TENSIONING DEVICE

[75] Inventor: Otto Zollinger, Spartanburg, S.C.

[73] Assignee: Otto Zollinger, Inc., Spartanburg, S.C.

[21] Appl. No.: 952,939

[22] Filed: Oct. 19, 1978

Related U.S. Patent Documents

Reissue of:

[64] Patent No.: 3,874,613
Issued: Apr. 1, 1975
Appl. No.: 381,979
Filed: Jul. 23, 1973

U.S. Applications:

[63] Continuation-in-part of Ser. No. 297,995, Oct. 16, 1972, Pat. No. 3,753,535.

[51] Int. Cl.[3] ..... B65H 59/22
[52] U.S. Cl. ..... 242/152.1
[58] Field of Search ..... 242/152.1, 151, 149, 242/147 R, 147 M, 129.8, 157 R; 226/91, 97, 195

[56] References Cited

U.S. PATENT DOCUMENTS

| | | | |
|---|---|---|---|
| 855803 | 6/1907 | Palmer | 242/157 C |
| 1,040,185 | 10/1912 | Gerstberger | 242/152.1 |
| 1,490,512 | 4/1924 | Hill et al. | 242/152.1 |
| 1,785,987 | 12/1930 | Stewart | 242/152.1 X |
| 2,222,921 | 11/1940 | Van Den Bergh | 242/152.1 X |
| 2,373,513 | 4/1945 | Stevenson | 242/152.1 |
| 3,077,313 | 2/1963 | Seney | 242/157 R |
| 3,080,135 | 3/1963 | Steijn | 242/157 R |
| 3,130,938 | 4/1964 | Dysart | 242/157 R |
| 3,182,926 | 5/1965 | Imhof | 242/157 R |

FOREIGN PATENT DOCUMENTS

| | | | |
|---|---|---|---|
| 41573 | 9/1965 | Fed. Rep. of Germany . | |
| 855300 | 2/1940 | France | 242/152.1 |

*Primary Examiner*—Stanley N. Gilreath
*Attorney, Agent, or Firm*—Wellington M. Manning, Jr.; Luke J. Wilburn, Jr.

[57] ABSTRACT

An improved device is disclosed for tensioning a running length of textile yarn. The device has a housing with a yarn passageway extending therethrough. An annular seat is provided in the passageway to receive a spherical element, the surface around the annulus having a radius of curvature upwardly and outwardly therefrom. An upper end of the yarn passageway is provided with an abrasion resistant surface having smooth rounded edges at termination of the passageway, and may be in the form of an insert into the housing or an integral part of the housing. At least one spherical element is receivable in the passageway and resideable at the seat. The spherical element is out of contact with walls defining said passageway when at rest on the seat. One embodiment of the invention includes at least one spherical element in the passageway and a further, larger spherical element that resides atop the passageway, in engagement with the abrasion resistant surface thereat. The housing, seat and abrasion resistant upper end surface may be of integral construction. Further, a collar may be removably received around the housing with an arm secured thereto and extending across at least a portion of the passageway to prevent egress of the spherical element without adversely affecting tension on or condition of the yarn. Mounting means may also be provided for securing the device to a yarn handling machine.

30 Claims, 6 Drawing Figures

YARN TENSIONING DEVICE

Matter enclosed in heavy brackets [ ] appears in the original patent but forms no part of this reissue specification; matter printed in italics indicates the additions made by reissue.

CROSS REFERENCE TO RELATED APPLICATION

This application is a continuation-in-part of application, Ser. No. 297,995, filed Oct. 16, 1972, now U.S. Pat. No. 3,753,535.

BACKGROUND OF THE INVENTION

Numerous devices have heretofore been produced for the tensioning of a running length of textile yarn. Further, certain of these devices have incorporated the use of spherical element such as a ball which is received in a conical support through which yarn passes. The weight of the ball thus rests on the support, impeding the progress of yarn passing therebetween. These prior art devices have, however, been deficient for numerous reasons. For example, the majority of the devices are substantially enclosed, thus hindering feeding of yarn therethrough. Further, other of the devices are restricted to particular types of yarn. Still further, other devices operate on a principle different from that of the instant invention, though a yarn passageway and a spherical element are involved.

The present invention thus provides an improved yarn tensioning device over those of the prior art, wherein at least one spherical element resides on a seat and engages a yarn passing therethrough, said element impeding the progress of the yarn by a predetermined amount and rolling at said seat as the yarn passes thereby. If a plurality of spherical elements are employed within a yarn passageway, one resides at the seat with any others residing atop the next lower element. The device of the present invention further possesses certain definite advantages over the prior art. For example, it is easily manufactured; threading of yarn is quite simple and quick; no surfaces are available for abrasion of the yarn, no areas are provided to collect any appreciable lint; and tension is automatically maintained without any adjustments after start up.

The prior art is devoid of any teaching or suggestion of the present invention. Exemplary of the prior art are U.S. Pat. Nos. 112,501 to Sargent et al.; 1,408,560 to Bingham et al.; 1,432,399 to Land; 1,490,512 to Hill et al.; 1,785,987 to Stewart; 2,222,921 to Van Den Bergh; 2,373,513 to Stevenson; 2,492,778 to Agresti et al.; 2,677,511 to Bley; and 3,309,858 to Franzen and German Patent No. 1,061,239 to Colo.

SUMMARY OF THE INVENTION

It is an object of the present invention to provide an improved yarn tensioning device.

Another object of the present invention is to provide an improved integral device for the tensioning of a running length of textile yarn.

Yet another object of the present invention is to provide an improved yarn tension device that employs a spherical element to tension the yarn and has an abrasion resistant upper surface.

Still another object of the present invention is to provide an improved tension device that employs a plurality of different size spherical elements to tension a yarn.

Generally speaking, the device of the present invention comprises a housing, said housing having a yarn passageway extending therethrough, said housing having a seat in said passageway to receive a spherical element thereat, said passageway further having rounded corners at an upper end thereof, away from said set with said upper end of said passageway having an abrasion resistant surface thereat, said seat having an opening therethrough and surfaces around said opening having a continuous curvature outwardly therefrom; and at least one spherical element receivable in said passageway and resideable at said seat, said element being out of contact with walls of said passageway when at rest on said seat.

More specifically, the device of the present invention provides an elongated yarn passageway through a housing, with an annular seat provided therealong. Side walls of the passageway may be straight, down to the seat, or may vary in diameter either gradually or abruptly. In any case, however, the spherical element is out of contact with the walls of the passageway while at rest at the seat. The abrasion resistant surface at the top of the passageway may be provided by an annular abrasion resistant insert that defines the end of the passageway, or may be provided as part of an integral housing. The lower portion of the housing is further preferably rounded to compensate for yarn ballooning thereat without adverse affects to the yarn or tension control of the yarn.

The yarn passageway extends above the spherical element received therein and appreciably above the spherical element in certain arrangements. As such, the spherical element or elements will not be forced out the top of the housing during normal operation of the device. A possibility does exist, however, that an operator may strike the bottom of the device and cause the one or more of the spherical elements to fly out the top of the yarn passageway. To preclude this eventuality, a collar may be provided for the present device having a small arm that extends at least partially across the top of the passageway. The arm does not block the passageway; has smooth streamlined surfaces to prevent damage to yarn passing therethrough; does not collect waste; and is moveable around the housing for placement to accommodate the particular yarn being tensioned.

Moreover, while the device of the present invention is designed to preclude collection of waste, even with the spherical element retarding arm, it is sometimes desirable to clean the device. Likewise, it is alway desirable to know that the device is functioning properly; that the desired number and desired size spherical elements are being utilized. A tension device having a transparent housing readily permits visual inspection of the device during operation. A transparent housing may thus be fabricated, preferably by molding from a transparent plastic material, followed by placement of a seat insert and a top insert therein.

Certain yarns are very kinky, curly or the like due to the process by which it has been textured, the particular type of yarn and/or off target process conditions. These yarns may experience difficulty in being appropriately tensioned to exit the device in a relaxed condition. A further embodiment of the present invention thus utilizes the general device of the present invention plus a further large spherical element that does not fit within the yarn passageway, but resides at the top of the yarn passageway. The large spherical element makes contact with the rounded upper end of the passageway and entraps the yarn thereat. Preferably, the abrasion resistant insert is employed and functions as a seat for the large spherical element. Moreover, since the large spherical element rests atop the device of the present invention, it is quite desirable to further employ means thereat to loosely hold the large spherical element atop the device.

A mounting means may also be provided for the tension device of the present invention and may take numerous forms. The housing may have an elongated slotted member secured thereto and extending outwardly therefrom. Likewise, a separate mounting means may be secureable to the housing at different angles to permit custom mounting of the device for the particular machine on which it is to be fixed. Mounting versatility is quite important for a universal type tension device since the device may be employed in virtually any situation where a textile strand is to be tensioned within controlled limits. The vast number of types of machines conducting these operations differ substantially, and the adaptability of the mounting feature is thus quite advantageous.

Feeding of yarn into the tension device of the present invention is quite quick and simple. Compressed air may be introduced at the lower end of the device into the yarn passageway. The compressed air overcomes the weight of the spherical element and forces the element off the seat into the passageway thereabove. While the element remains suspended in air, yarn may be placed at the entrance to the passageway and is picked up by the air stream and carried therewith, passing around the spherical element and out the opposite upper end of the device. The pressurized air is then removed and the spherical element falls back towards the seat and entraps the yarn against the seat. Thereafter, as the yarn begins to move, the force of the moving yarn partially overcomes the weight of the spherical element and forces the element upwardly by a predetermined amount. Generally, the spherical element pivots upwardly at the side opposite the yarn and rolls at the seat with the yarn passing therearound. It should be further pointed out that the size and weight of the inside spherical elements are predetermined with respect to the physical dimensions of the passageway such that when the spherical element is present at the seat, it is out of contact with the walls of the passageway and yarn may pass therearound without sufficient force to expel the spherical element from within the housing. The upper end of the passageway may thus be unrestricted, though certain embodiments of the present invention include a barrier and/or a large spherical element thereat.

Yarn may also be fed through the present tension device by affixing the yarn to a thin elongated instrument and pushing the instrument upwardly through the passageway, forcing the spherical element off the seat and passing therearound.

DESCRIPTION OF THE PREFERRED EMBODIMENTS

Figure 1:
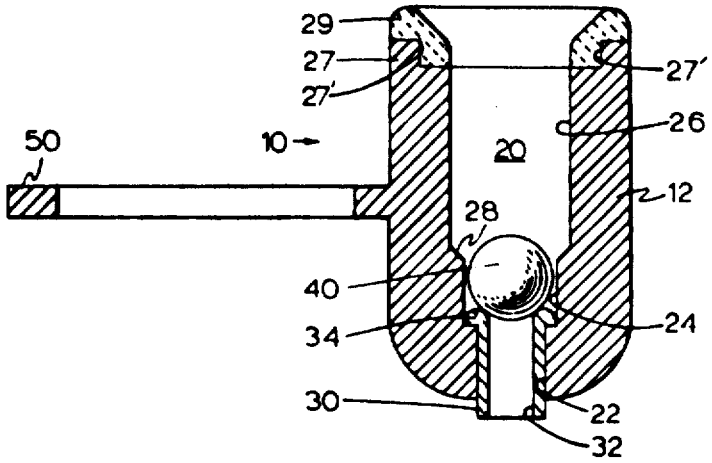
FIG. 1 is a side cross sectional view of a yarn tension device according to the present invention.
Figure 2:
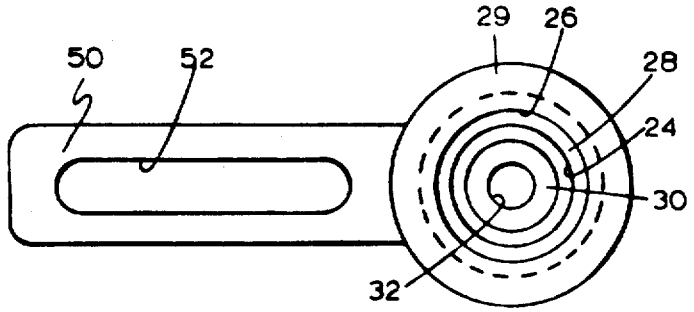
FIG. 2 is a top view of a device as shown in FIG. 1.

Making reference to the drawings, preferred embodiments of the present invention will now be described in detail. FIGS. 1 and 2 illustrate a tension control device according to the present invention generally indicated as 10. Tension control device 10 may be employed on any yarn handling machine at a particular disposition with yarn passing therethrough in either direction.

Tension device 10 is made up of a housing 12 having a yarn passageway 20 extending completely therethrough. Yarn passageway 20 as illustrated in FIG. 1 is comprised of a small diameter section 22, a medium diameter section 24 and a large diameter section 26. The small diameter section 22 is located at the bottom of housing 12 and has an insert 30 received therein, the purpose of which will be described hereinafter. Insert 30 contains an annular passage or opening 32 extending therethrough and has an upper end 34 that is enlarged to the approximate size of medium diameter passageway section 24 and defines an uninterrupted annular seat thereat. All surfaces on insert 30 that come into contact with yarn are smooth with rounded edges and preferably, insert 30 is manufactured of a ceramic composite that exhibits long wear characteristics when in constant engagement with a moving textile yarn. Upper end 34 of insert 30 has a radius of curvature extending outwardly from opening 32. As such, a spherical element 40 residing on seat 34 makes tangential, point type contact around opening 32, since the curvature of element 40 is opposite the curvature of seat 34. Hence a yarn passing between spherical element 40 and seat 32 will cause element 40 to pivot upwardly about seat 34 instead of completely leaving seat 34 in situations where flat or conical seat surfaces are utilized. Knots, twists, and the like in the yarn may thus pass element 40 without any substantial loss of tension control.

Figure 6:
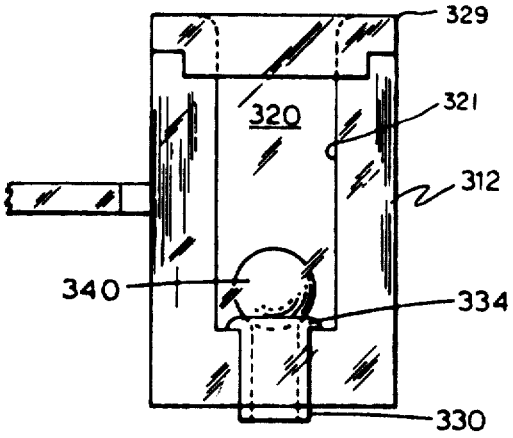
FIG. 6 is a side elevational view of a yarn tension device according to the present invention illustrating yet another embodiment thereof.

The internal configuration of passageway 20 may differ as further illustrated in FIG. 6. Yarn passageway 320 in FIG. 6 is provided with straight walls 321 down below seat 334 on insert 330. In both embodiments, however, spherical elements 40 and 340 do not touch the walls of the passageway while at rest on seats 34 and 334 repectively. Likewise, the relative dimensions of the yarn passageway to the spherical element adjacent the annular seat are such that the spherical element is precluded from permanent lateral movement away from the seat under normal operating conditions.

At least one spherical element 40 is received in passageway 20 and resides in medium diameter section 24 on seat 34 of insert 30. Spherical element 40 is preferably a stainless steel ball of a predetermined diameter relative to the diameters of medium diameter section 24 and large diameter section 26 of tubular passageway 20 and a predetermined weight relative to the particular yarn being tensioned. In this fashion, spherical element 40 closely approximates the diameter of mid section 24 so as to be held on seat 34 against permanent lateral movement therefrom. As such, should it become desirable to position tension device 10 angularly with respect to vertical, spherical element 40 will not roll off seat 34. Moreover, when at rest on seat 34, spherical element 40 does not engage walls defining passageway 20.

At the junction of sections 24 and 26 of passageway 20, a tapered wall section 28 is provided. The remainder of the passageway areas, are preferably straight, though the walls of section 26 may tape gradually outwardly from the junction with section 24. Hence, when spherical element 40 is up within large diameter section 26, it will always return to the bottom of section 24 to properly reside on seat 34 of insert 30.

Passageway 20 is provided at its upper end 27 with an abrasion resistant material having smooth rounded edges. In FIG. 1, housing 12 has a cutaway portion 27' at upper end 27 with a mating insert 29 received therein and providing a smooth continuation of passageway 20. Insert 29 is manufactured of a material that readily withstands abrasion by yarn passing thereacross. Preferably, insert 29 is a ceramic material and most preferably is molded aluminum oxide.

Also making reference to FIGS. 1 and 2, a mounting means 50 is secured to housing 12 so as to facilitate attachment of device 10 on a yarn handling machine. As illustrated in the FIGS., the preferred embodiment is a bracket 50 which is integral with housing 12 and has an elongated slot 52 extending therealong. Tension device 10 may thus be adjustably mounted with respect to the source of yarn and/or the delivery point on the yarn handling machine (not shown). The particular yarn handling machines that may suitably use the device of the present invention are well within the purview of one skilled in the art and illustration thereof is shot believed necessary.

Figure 3:
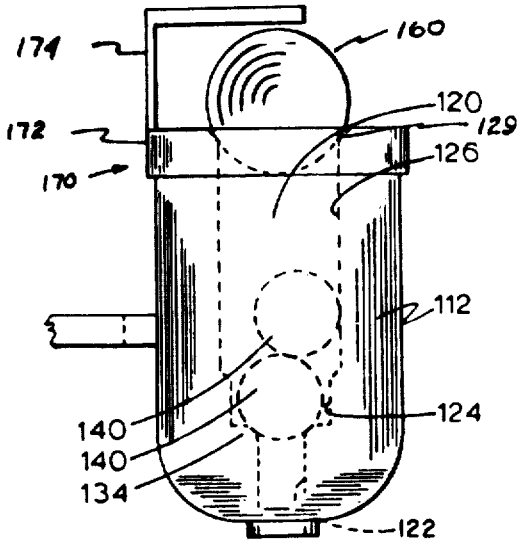
FIG. 3 is a side elevational view of a further embodiment of a yarn tension device according to the teachings of the present invention.

FIG. 3 illustrates a further embodiment of a tension system according to the present invention that is particularly useful in handling yarns that exhibit a high degree of crinkling when relaxed. The device has a housing 112 through which extends a tubular passageway 120. Tubular passageway 120 has a plurality of sections 122, 124 and 126 in the sense as stated with respect to FIG. 1. Furthermore, a seat 134 is received in section 122 of tubular passageway 120 and is integral with housing 112. One or more spherical elements 140 (two are illustrated) are received inside passageway 120 with the lower element 140 being received on seat 134. Additionally, a large spherical element 160 is located outside passageway 120 and is received atop same at rounded top corners 129 which define as outside seat. Large spherical element 160 further controls yarn passing thereby and permits a very crinkly yarn to exit the device completely relaxed and straight. Since large spherical element 160 is received atop housing 112 outside of passageway 120, it is further perferable to employ a means in conjunction therewith to prevent removal of spherical element 160 from its outside seat while permitting free rotation of same thereat. A holding means 170 is illustrated to maintain spherical element 160 in its proper position and comprises a collar 172 positioned around housing 112, having a member 174 extending above large spherical element 160 and at least partially across same. Holding means 170 is of course removably received around housing 112. Holding means 170 may be a flat member as illustrated in FIG. 3, may take the form described hereinafter with respect to FIGS. 4 and 5, or may be of other designs.

Figure 4:
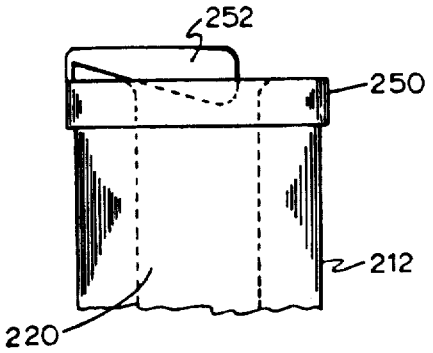
FIG. 4 is a partial side elevational view of a tension device according to the present invention illustrating a further embodiment thereof.
Figure 5:
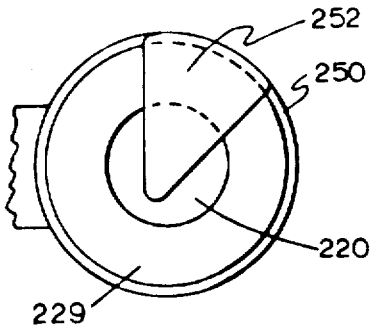
FIG. 5 is a partial top plan view of a yarn tension device as illustrated in FIG. 4.

FIGS. 4 and 5 illustrate a further embodiment of the tension device of the present invention. A portion of a housing 212 is shown having a yarn passageway 220 therethrough with a top insert 229 received at the upper end thereof. A collar 250 is removably received around at least a portion of insert 229 of housing 212 and is capable of rotary movement thereat. An arm 252 is secured to collar 250 and extends at least partially across the upper end of passageway 220. While normal operation of the tension device of the present invention will not dislodge the spherical element or elements from the passageway, a blow to the lower end of the housing can propel the element out. As such, removable barrier means may be desired. When the barrier is used, however, yarn passing out from the passageway will avoid arm 252 whereby no frictional or tension problems result. Furthermore, should the yarn engage arm 252, all contact surfaces are smooth and rounded, and further, arm 252 may be rotated away from the yarn path, out of contact with the yarn. Preferably, arm 252 is wedge shaped as shown in FIGS. 4 and 5 and extends progressively downwardly into passageway 220 towards the terminal end thereof. While collar 250 has been described, other barrier means may be employed so long as they have no adverse effect on yarn passing thereby.

FIG. 6 represents yet another embodiment of the present invention. As illustrated, a housing 312 is produced from a transparent material and is preferably molded from a plastic material that yields a transparent product. Seat insert 330 and top insert 329 will, however, be manufactured of an abrasion resistant material such as aluminum oxide. Transparency of housing 312 permits ready visual inspection of the device during operation whereby one can ascertain that the passageway is free of lint and other undesirables, that the correct number and size spherical elements are being used, and generally that the device is functioning properly.

While the various embodiments of the present invention are illustrated in certain FIGS., the individual components of the embodiments are interchangeable. For instance, in those FIGS. where an insert is shown at the top of the device, an integral constructed device may also be employed, and vice versa.

The tension device according to the present invention may be manufactured as desired from any suitable material that will withstand the abrasion caused by yarn passing thereover without being damaged or without causing damage to the yarn. Plastic materials are very suitable due to the ease of use in manufacture of the device and the economics thereof. Injection molding is thus quite acceptable as manufacturing technique for producing the instant tension device. As mentioned above, however, ceramic composites are preferred for the inserts due to the expected wear at that particular part of the device, along with a stainless steel spherical element. Likewise, as mentioned above, the housing and both inserts may be integral construction, preferably being manufactured of an abrasion resistant material such as aluminum oxide.

Having described the present invention in detail, it is obvious that one skilled in the art will be able to make variations and modifications thereto without departing from the scope of the invention. Accordingly, the scope of the present invention should be determined only by the claims appended hereto.

What is claimed is:

1. A tension device comprising:

a. a housing, said housing having a yarn passageway extending therethrough, said yarn passageway having a large diameter section and a small diameter section, an [outer] *upper* end of said large diameter section of passageway having rounded abrasion resistant corners;

b. *a first insert defining* an uninterrupted seat provided along said passageway at the junction of said large and small diameter sections and having an opening therethrough, said seat receiving a spherical element thereat and holding said spherical element out of contact with walls of said large diameter section of said passageway when no yarn is passing through said opening, said seat having surfaces around said opening with a radius of curvature opposite the curvature of said spherical element; and c. a spherical element receivable in said large diameter section of said passageway, said spherical element having a diameter less than the length of said large diameter section and said large diameter section having a diameter adjacent said seat to prohibit substantial lateral movment of said spherical element received thereat *said passageway being smooth surfaced and substantially unrestricted upwardly from said seat for a distance sufficient to permit substantially unrestricted upward movement of said spherical element during tensioning of a yarn.*

2. A yarn tension device as defined in claim 1 wherein said rounded, abrasion resistant corners of said passageway are provided by [an] *a second* insert received on said housing.

3. A yarn tension device as defined in claim 2 wherein said housing is provided with a shoulder around said [top] *upper end* and said *second* insert is received on said shoulder, said *second* insert having an opening extending therethrough, the top of said *second* insert having smooth rounded edges around said opening, and then flaring outwardly in conical fashion.

4. A yarn tension device as defined in claim 3 wherein the diameter of said opening through said *second* insert is substantially the same as the diameter of said passageway thereat, whereby said opening provides a continuation of said passageway.

[5. A yarn tension device as defined in claim 1 wherein said seat is provided by an insert received in said passageway.]

6. A yarn tension device as defined in claim [5] *1* wherein said seat insert is aluminum oxide.

[7. A yarn tension device as defined in claim 1 wherein the housing and seat are integral and are constructed of a material that is resistant to abrasion by a yarn passing in contact therewith.]

[8. A yarn tension device as defined in claim 7 wherein the device is manufactured of aluminum oxide.]

9. A yarn tension device as defined in claim 1 wherein further means are provided adjacent the top of said passageway to preclude removal of said spherical element from said passageway while permitting yarn to pass unaffected thereby.

10. A yarn tension device as defined in claim 9 wherein said means comprise a collar removably receivable around said housing at the top thereof, said collar having an arm secured thereto and extending inwardly at least partially across said passageway, said arm having smooth rounded surfaces thereon.

11. A yarn tension device as defined in claim 10 wherein said arm extends progressively downwardly into said passageway toward the terminal end thereof.

12. A yarn tension device comprising:

a. a housing, said housing having a yarn passageway extending therethrough, said housing having a seat for a spherical element in said passageway, said passageway having rounded abrasion resistant corners at an outer end thereof, said seat having an opening therethrough with surfaces therearound having a radius of curvature outwardly therefrom;

b. a first spherical element receivable in said passageway and residable at said seat, said first spherical element being out of contact with walls of said passageway when at rest on said seat;

c. a large spherical element, said large spherical element being received at said rounded, abrasion resistant corners atop said passageway; and d. holding means for said large spherical element associated with said device *said passageway being substantially unrestricted upwardly from said seat for a distance sufficient to permit substantially unrestricted upward movement of said first spherical element during tensioning of a yarn.*

13. A yarn tension device as defined in claim [1] *12* wherein said housing is manufactured of a plastic material.

14. A yarn tension device as defined in claim 13 wherein said plastic material is transparent.

15. A yarn tension device as defined in claim 1 comprising further mounting means secured to said housing.

16. A yarn tension device as defined in claim 15 wherein said mounting means comprise an elongated member, said member having a slot extending along a portion of the length thereof.

17. A yarn tension device as defined in claim [1] *12* wherein said housing has a lower end that angles in toward said passageway, said angled lower end having a smooth outer surface.

18. A yarn tension device as defined in claim 17 wherein said angled lower end of said housing is radiused inwardly to said passageway.

19. A yarn tension device comprising:

a. a housing, said housing having a yarn passageway extending therethrough, said passageway having an abrasion resistant surface with rounded edges at an upper end thereof, said housing further having a rounded bottom;

b. an annular, uninterrupted insert provided along said passageway, *said* insert [seat] having an opening therethrough with smooth curved surfaces around said opening to define a seat and receive a spherical element thereat, said curved surfaces of said insert having a radius of curvature opposite the curvature of said spherical element whereby said spherical element makes point contact with said seat around said annulus and resides at said seat out of contact with walls of said passageway when no yarn is passing through said annulus; and c. at least one spherical element being receivable in said passageway, the diameter of said spherical element being less than the length of said passageway above said seat *said passageway being smooth surfaced and substantially unrestricted upwardly from said insert for a distance sufficient to permit substantially unrestricted upward movement of said spherical element during tensioning of a yarn.*

[20. A yarn tension device as defined in claim 19 wherein said housing and annular seat are integral.]

21. A yarn tension device as defined in claim 19 wherein the housing adjacent the top of said passageway is cutaway to define a shoulder around said passageway and an annular insert is received therein, said insert providing the abrasion resistant surface and smooth rounded edges.

22. A yarn tension device as defined in claim 21 wherein said insert is manufactured of aluminum oxide.

23. A yarn tension device as defined in claim 19 comprising further a collar [removable] *removably* received around said housing, said collar having an arm secured thereto and extending inwardly over a portion of said passageway, said arm precluding removal of said spherical element while permitting unimpeded movement of yarn thereby.

24. A yarn tension device as defined in claim 19 wherein said housing is manufactured of a transparent plastic material.

25. A yarn tension device as defined in claim 19 wherein the upper end of said passageway defines a second annular seat and comprising further a large spherical element receivable at said second seat, atop said passageway, said second large spherical element further tensioning yarn passing thereby.

26. A yarn tension device as defined in claim 19 wherein mounting means are secured to said housing.

27. A yarn tension device as defined in claim 26 wherein said mounting means comprise an elongated member having a slot extending a portion of the length thereof.

28. A yarn tension device comprising:

a. a housing, said housing having a rounded bottom and having a yarn passageway extending therethrough, said passageway having a large diameter section and a small diameter section therealong;

b. an annular, uninterrupted seat received in said passageway at the junction of said large and small diameter sections, said seat having continuous curvature away from said annulus at least through an area to be contacted by a spherical element *said seat being defined by a first insert received in said passageway*;

c. A spherical element receivable in said passageway and residable at said seat without making contact with walls of said large diameter section of said passageway, said spherical element having a diameter less than the length of the large diameter section of said passageway;

d. [an] *a second* insert received in an upper end of said large diameter section of said passageway, said *second* insert having an opening therethrough whose diameter is substantially the same as the diameter of said passageway, and having smooth rounded corners around an upper end of said insert opening; and e. a collar removeably receivable around said housing at said insert, said collar having an arm securd thereto and extending at least partially across said passageway *said passageway being substantially unrestricted upwardly from said seat for a distance sufficient to permit substantially unrestricted upward movement of said spherical element during tensioning of a yarn.*

[29. A yarn tension device as defined in claim 28 wherein said housing, insert and seat are of integral construction.]

30. A yarn tension device as defined in claim 28 wherein said housing is manufactured of a transparent plastic material.

31. A yarn tension device as defined in claim 28 wherein further a large spherical element is received atop said *second* insert and residable at said *second* insert opening which defines a seat therefor, said [area] *arm* secured to said collar being positioned above said large spherical element.

32. A yarn tension device comprising:

a. a housing, said housing having a yarn passageway extending therethrough, said passageway having a large diameter section and a small diameter section, said large diameter section having a diameter at an upper end thereof at least as large as the diameter at a lower end thereof;

b. an uninterrupted insert received in said passageway and having an opening therethrough, said insert having a surface around said opening curving outwardly therefrom to define an annular seat at the junction of said large and small diameter sections, c. a spherical element receivable in said large diameter section of said passageway and being residable at said annular seat, said spherical element having a diameter compared to the diameter of the passageway at said seat such that permanent lateral movement away from said seat is precluded, said spherical element being out of contact with walls defining said large diameter section of said passageway when at rest on said seat with no yarn passing thereby; and d. a collar removeably receivable around said housing adjacent an upper end thereof, said collar having means thereon to preclude removal of said spherical element from said passageway without impeding passage of yarn thereby *said passageway being substantially unrestricted upwardly from said insert for a distance sufficient to permit substantially unrestricted upward movement of said spherical element during tensioning of a yarn.*

33. A yarn tension device as defined in claim 32 wherein said means on said collar is an arm secured thereto and extending outwardly across at least a portion of the top of said passageway.

*34. A tension device comprising:*

*(a) a housing, said housing having a yarn passageway therethrough, said passageway having a large diameter section and a small diameter section, said passageway having rounded, abrasion resistant corners at an outer end of same;*

*(b) an uninterrupted insert received in said passageway and having an opening therethrough, said insert having a surface around said opening curving outwardly therefrom to define an annular seat at the junction of said large and small diameter sections;*

*(c) a spherical element receivable in said large diameter section of said passageway and being residable at said annular seat, said spherical element having a diameter compared to the diameter of the passageway at said seat such that permanent lateral movement away from said seat is precluded, said spherical element being out of contact with walls defining said large diameter section of said passageway when at rest on said seat with no yarn passing thereby; said passageway being substantially unrestricted upwardly from said seat for at least a length to receive two spherical elements therein and permit substantially unrestricted upward movement of the number of spherical elements utilized therein during tensioning of a yarn, said passageway above said seat having smooth walls therealong.*

*35. A tension device as defined in claim 34 wherein said yarn passageway above said seat is unrestricted and has smooth walls at least substantially along the length of the housing.*

* * * * *